J. A. DEMPSEY.
HOSE COUPLING.
APPLICATION FILED AUG. 31, 1917.
1,298,303.
Patented Mar. 25, 1919.
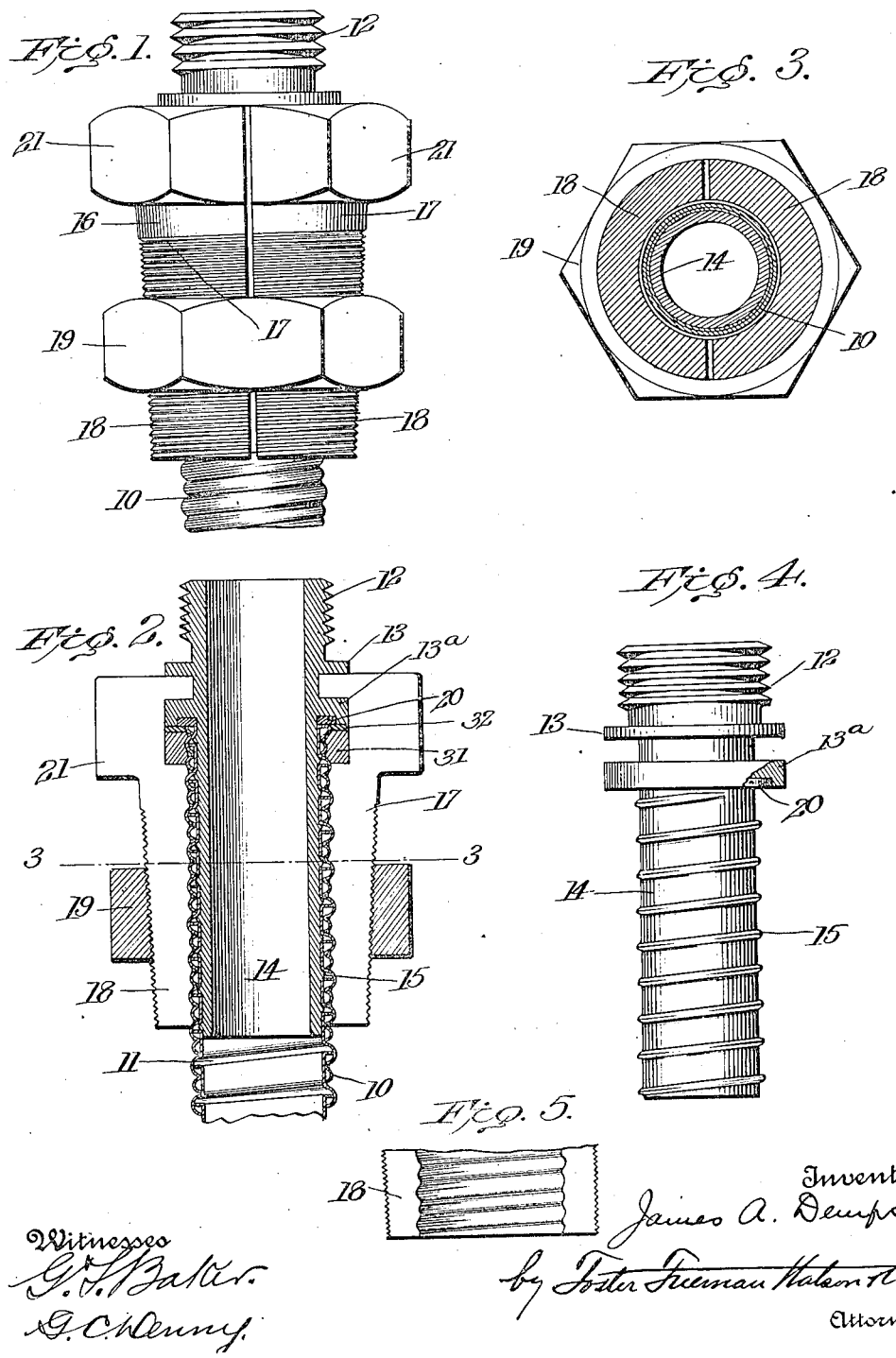

UNITED STATES PATENT OFFICE.

JAMES A. DEMPSEY, OF NEW YORK, N. Y.

HOSE-COUPLING.

1,298,303. Specification of Letters Patent. Patented Mar. 25, 1919.

Application filed August 31, 1917. Serial No. 189,132.

*To all whom it may concern:*

Be it known that I, JAMES A. DEMPSEY, a citizen of the United States and resident of New York, county and State of New York, have invented certain new and useful Improvements in Hose-Couplings, of which the following is a specification.

This invention relates to hose couplings and more particularly to means for attaching the male and female parts to flexible metallic hose. It is the object of the invention to provide a construction which will permit the parts to be readily attached to and detached from the hose and when attached be firmly secured to prevent them from being pulled apart.

The novel features of the invention will be apparent from the following description taken in connection with the accompanying drawings in which, Figure 1 is a side elevation of a piece of flexible metallic hose having my improved coupling attached thereto;

Fig. 2 is a longitudinal section;

Fig. 3 is a transverse section on the line 3—3, of Fig. 2;

Fig. 4 is an elevation of the inner tubular member, and

Fig. 5 is an elevation, of a portion of one of the halves of the sleeve, showing the internal spiral grooves.

Referring to the drawings, 10 indicates a section of flexible metallic hose and as ordinarily constructed such hose is formed of spirally laid strips providing one or more spiral grooves 11 on the interior of the hose. For the purpose of illustrating my invention I have shown one half of the coupling and this half comprises the male externally threaded part 12 having flanges or collars 13—13ª, and a tubular extension 14, on the exterior of which is a spiral bead or thread 15 corresponding with the groove 11 so that the tubular extension 14 may be screwed into the end of the hose 10.

The hose is screwed onto the tubular extension 14 until its end abuts a packing 20 fitted in a seat formed in the flange 13ª. The coils of the hose body offer no obstruction to the turning movement by which the hose and coupling section 14 are thus engaged. However any movement of the hose in a reverse direction acts to produce a binding action between the hose and coupling, which resists any tendency to separate the hose from the coupling.

To insure an absolute fluid tight joint between the several parts a nut 31 is fitted about the hose and against a washer 32.

In order to secure the tubular member 14 in the hose I provide a split sleeve comprising the halves 16 and 17, preferably formed on the interior with spiral grooves (see Fig. 5) adapted to fit the exterior of the hose.

The members 16, 17 of the securing sleeve are provided with suitable grooves to receive the flange 13ª and nut 31 which thus act to properly position or aline such members when fitted on the coupling. The halves 16 and 17 are tapered on the outside and the tapered portion is provided with threads 18 with which a nut 19 coöperates to clamp the halves on to the exterior of the hose. To permit the halves to be held while the nut 19 is being turned they are provided with hexagonal portions 21.

When the nut 19 is screwed on to the sleeve the halves 16 and 17 are clamped on the exterior of the hose and the latter is clamped against the tubular member 14. On account of the tubular member 14 being provided with the bead or thread 15, fitting the internal groove in the hose the tubular member will be securely held, the bead preventing the tubular member from being pulled out of the hose. The spiral arrangement of the bead also permits the tubular member to be screwed into the hose for the purpose of attaching it thereto.

Having described my invention what I claim and desire to secure by Letters-Patent is:

1. A hose coupling comprising a tubular member adapted to be inserted in the end of a section of hose and provided with an annular flange against which the end of the hose will abut, a nut adapted to clamp the hose to the tubular member and abut said flange, a split sleeve surrounding the tubular member and provided with a recess to receive said flange and nut, and a nut fitted to the sleeve and adapted to cause the sleeve to firmly clamp the hose onto said tubular member.

2. A coupling for hose having interior and exterior threads, produced by a spiral groove formed in its body, comprising a tubular member provided with an exterior thread adapted to be screwed into an end of a hose section, engaging the interior thread thereof, a nut adapted to engage the exterior thread on the hose, a split sleeve adapted to directly engage the exterior thread of the hose and having a recess to receive said nut, and means for clamping the sections of the sleeve upon the hose and interior tubular member.

3. A hose coupling comprising an exteriorly threaded tubular member adapted to be screwed into an end of a section of hose and provided with an annular flange against which the end of the hose will abut, means for clamping the hose to said tubular threaded member, a split sleeve surrounding the threaded member and hose and recessed on its inner face to receive said flange and clamping means, and means for holding said sleeve in close engagement with the hose.

In testimony whereof I affix my signature.

JAMES A. DEMPSEY.